(No Model.)

S. BROADBENT.
Axle Lubricator.

No. 229,859.　　　　　　　　　Patented July 13, 1880.

Witnesses　　　　　　　　　　　　　　Inventor
Chas. H. Smith　　　　　　　　　　　Sidney Broadbent.
Harold Serrell　　　　　　　　　per Lemuel W. Serrell
　　　　　　　　　　　　　　　　　　　　Atty.

UNITED STATES PATENT OFFICE.

SIDNEY BROADBENT, OF SCRANTON, PENNSYLVANIA.

AXLE-LUBRICATOR.

SPECIFICATION forming part of Letters Patent No. 229,859, dated July 13, 1880.

Application filed April 12, 1880. (No model.)

*To all whom it may concern:*

Be it known that I, SIDNEY BROADBENT, of Scranton, in the county of Lackawanna and State of Pennsylvania, have invented an Improvement in Lubricating Axles, Boxes, Car and other Wheels, and Loose Pulleys, of which the following is a specification.

Car and other axles have been made tubular, either at the ends or at the central portion, and into this the oil has been introduced from a holder or cup at the end. This is not adapted to the axles of coal-cars in which the wheels are loose upon the axles, and said axles also revolve in boxes. Besides this the oil is difficult to apply and the apparatus costly.

In other instances the oil has been placed in a tube with a valve that is opened by screwing the tube into the axle. This allows the oil to run out and waste.

My invention is made for simplifying the lubricating device and rendering it easy of application to any shaft or axle around the end of which a box or a wheel, or both, are applied.

I make use of a loose movable oil-cartridge of a size and shape adapted to be introduced into a hollow axle or shaft, and retained therein by a plug or cap, or removed therefrom for filling. This cartridge is provided with one or more holes for the oil to pass out into the cavity in the axle, and there are one or more holes through the axle to the surface thereof, whereby the exterior of the axle and the wheel or bearing around, or partially around, the same is lubricated; and in this hole or holes there are pins that fit the same loosely and come into contact at their outer ends with the moving surface of the wheel, so as to be agitated thereby and keep the hole free, and when the parts that are being lubricated become sufficiently free from oil to allow air to pass into the oil chamber and cartridge, then such oil will be displaced to the extent of the air admitted, and will gradually spread itself upon the surfaces and lubricate the same.

Figure 1:
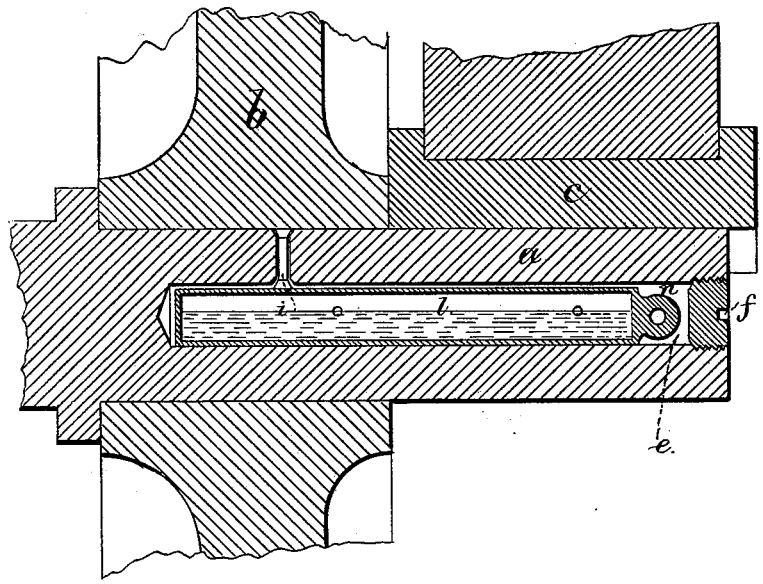
Figure 2:
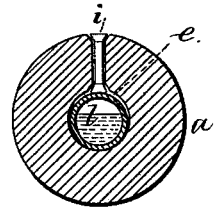
Figure 3:
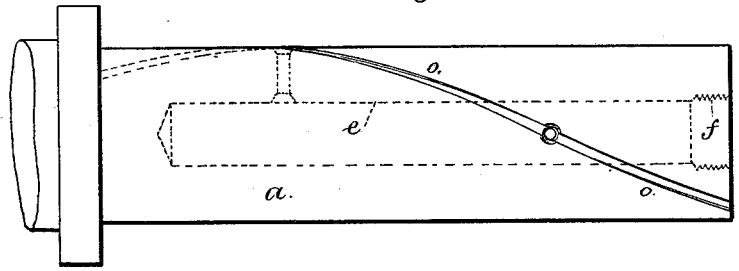

In the drawings, Figure 1 is a longitudinal section of the axle at one end and a portion of the wheel and bearing. Fig. 2 is a cross-section of the axle; and Fig. 3 represents the external surface of an axle adapted to use with carriage-wheels.

The axle or shaft $a$ is of any desired size or character. $b$ represents the hub of a loose car-wheel, and $c$ the bearing for the axle, these parts being similar to those used in coal-cars in mines. The hub may, however, cover the entire finished end portion of the axle or shaft, as in a vehicle-wheel, or the axle may revolve in the bearing, the wheel being connected firmly upon such axle, as in car-wheels.

Into the center of the axle $a$ a hole is bored to form an oil chamber or cavity, $e$, and the same is provided with a screw-cap or other air-tight plug, $f$, at the end. One or more radial holes pass from this chamber $e$ to the outside of the axle, and in each a pin, $i$, is introduced. This pin should be smaller than the hole, so that oil may pass through the hole at each side of the pin, and the pin should be made so as to project slightly from the surface of the axle, and hence come into contact with the surface to be lubricated, and receive a vibration or movement from the rubbing contact at the end, and thus keep the hole from becoming clogged, and there may be one or more grooves or channels, $o$, leading from the hole or holes, so as to convey the oil to the parts that are to be lubricated.

The pin $i$ should have a head at the inner end to prevent it falling out, and the outer end should be riveted up to prevent it falling in. This, however, is not always necessary, especially in oiling loose pulleys and car-wheels.

The oil-cartridge $l$ is tubular, and is of metal or other suitable material, and it is adapted to be introduced into or withdrawn from the oil-cavity $e$, an eye, $n$, being provided at one end, into which a wire hook is to be inserted, and there are one or more holes at one side of this oil-cartridge. The oil is easily introduced into the hollow axle by means of this oil-cartridge, and when the axle revolves the revolution of the oil-cartridge with it causes the oil to pass out from time to time as the air passes into the cartridge. With stationary axles the cartridge should be turned after it is inserted into the chamber, so as to bring the holes downwardly for the same purpose.

In my improvement the oil-cartridge is separate from the screw-plug, so as always to rest upon the bottom of the cavity, and hence the oil will not run out of the cartridge so long as there is oil in the cavity to prevent air passing into the hole or holes when these are at the bottom side of the cartridge, and when turned upwardly the oil will be retained by the cartridge being tight, except at the hole or holes that are in one side only.

Where a valve and opening at one end of the oil-case have before been used, and a hole at the bottom, the oil may all run out and be wasted.

I claim as my invention—

1. The tubular oil-cartridge having one or more holes at one side thereof only and otherwise tight, in combination with the axle having a hole for the reception of the oil-cartridge and a separate cap or plug to close said cavity tightly, substantially as specified.

2. The combination, with the axle, removable oil-cartridge, and plug or cap, of the pins $i$, within holes in the axle, substantially as set forth.

Signed by me this 3d day of April, A. D. 1880.

SIDNEY BROADBENT.

Witnesses:
JAS. H. TORREY,
CHAS. W. HAND.